United States Patent [19]

Leclercq et al.

[11] 3,946,158

[45] Mar. 23, 1976

[54] VIDEO-TELEPHONE SYSTEM INITIALLY SIGNIFIES CALLER TO CALLED SUBSCRIBER

[76] Inventors: Marc A. Leclercq, Ecole Lafontaine, voie due Bon Puits, Wissous, France, 92320; Alain M. Poirier, 82, rue de la Republique, Meudon, France, 92190; Jacques M. Guichard, 42, rue Gerard, Paris, France, 75013

[22] Filed: Apr. 25, 1975

[21] Appl. No.: 571,700

[30] Foreign Application Priority Data
Apr. 26, 1974 France .............................. 74.14599

[52] U.S. Cl. ................................ 179/2 TV; 179/5.5
[51] Int. Cl.[2] ......................................... H04M 11/08
[58] Field of Search .......................... 179/2 TV, 5.5

[56] References Cited
UNITED STATES PATENTS

| 3,787,626 | 1/1974 | Subieta .................................. 179/5.5 |
| 3,816,662 | 6/1974 | Shaver et al ....................... 179/2 TV |

FOREIGN PATENTS OR APPLICATIONS

| 998,475 | 1/1952 | France ............................. 179/2 TV |

OTHER PUBLICATIONS

*Review of the Electrical Communication Laboratories*, Vol. 21, Nos. 9–10, pp. 582–596, Sept.–Oct. 1973. "Video Response Equipment—Data Display with Video Telephone," T. Kamae et al.

*Primary Examiner*—Kathleen H. Claffy
*Assistant Examiner*—George G. Stellar
*Attorney, Agent, or Firm*—Abraham A. Saffitz

[57] ABSTRACT

Improvement to video-telephone systems allowing a called subscriber to have at his disposal on his television receiver screen, before he takes off his handset, information about the person who has initiated the call. Each subscriber station has a handset, a television camera, a television receiver and a character generator and is connected to a switching network by a telephone line, an incoming video line and an outgoing video line. Means are provided in the calling station for connecting to the outgoing video line the character generator when the calling subscriber takes down the handset and the television camera when video signals are detected on the incoming video line and in the called station for supplying with current the television receiver when ringing tone signals are detected on the telephone line.

3 Claims, 4 Drawing Figures

VIDEO-TELEPHONE SYSTEM INITIALLY SIGNIFIES CALLER TO CALLED SUBSCRIBER

The present invention concerns an improved video-telephone communication system in which information concerning a telephone subscriber caller, for example his name or his telephone number, is caused to appear on a television receiver screen at the called subscriber's location, before the latter takes down his handset.

At present, a subscriber called on video-telephone system does not know the identity of the caller when the ringing is taking place. It may happen, for various reasons, such a work time schedule, inconvenience and so on, the person called does not wish to accept the incoming call. The person called can make a decision in this connection if the name of the caller or any information defining him appears on the television screen when the telephone receiver rings.

It is known to arrange for the caller's number to be displayed visually on the telephone apparatus at the called subscriber's station. In such a system, a transmission device is located in the exchange connecting the calling subscriber and the called subscriber, and a receiving device is located in the stations of the subscribers using the service. In fact, in this system, the call to the called subscribers, instead of being made by the common usual ringing tone generator, comprises two signals: (i) an identification pulse signal in the form of an audio carrier modulated by the number of the calling subscriber and (ii) the usual ringing tone. The pulses of the identification signal are received and displayed on the telephone apparatus of the person called. In such a system, it is clear that the switching network has to be largely modified in order to substitute, after the step of connecting the calling and called subscribers' stations, a selective call process of the called subscriber's station to the non-selective usual call process which consists in connecting the ringing tone generator and the ringing back tone generator respectively to the called subscriber's line and calling subscriber's line. Further in this system of the prior art the information supplied to the called subscriber can only be the caller's number.

The object of the invention is to furnish information about the caller to the called party, before the latter accepts the call by taking off his receiver, by only slightly modifying the stations of a video-telephone and not at all the video-telephone switching network.

Character generators have been developed in the prior art for allowing alphanumeric characters to be displayed on a cathode ray tube in rows and columns. These character generators essentially comprise a random access memory (RAM) having stored therein at predetermined addresses first binary data words each representing a character in known codes such as the ASCII code and a read only memory (ROM) having stored therein at adresses defined by said first binary data words a plurality of second binary data words whose bits represent, according to the binary value of the bit, a dark or blank crosspoint in a character matrix of rows and columns. The character matrices have generally seven rows and five columns and are stored in the read only memory in the form of seven five-bit words. A matricial character read only memory is for example manufactured by the National Semiconductor Inc. Company under the commercial type designation MN 5240.

According to the invention, in a video-telephone network comprising a video-telephone switching network and a plurality of video-telephone stations each having a telephone handset, an audio bell associated thereto, a television camera, a television receiver and a character generator, and connected to said video-telephone switching network by a bidirectional telephone line conveying speech and ringing signals and by unidirectional incoming and outgoing video lines conveying video signals, there is provided in each station, first means for detecting the taking down of the handset, means responsive to said first detecting means for connecting the character generator to the outgoing video line, second means for detecting the ringing signals on the bidirectional telephone line, means responsive to said second detecting means for activating the associated television receiver, third means for detecting the video signals and means responsive to said third detecting means for connecting the television camera to the outgoing video line.

The invention will be better understood by referring to the following description and the attached drawings, in which.

In all of the figures, the same elements carry the same reference numerals.

Figure 1:
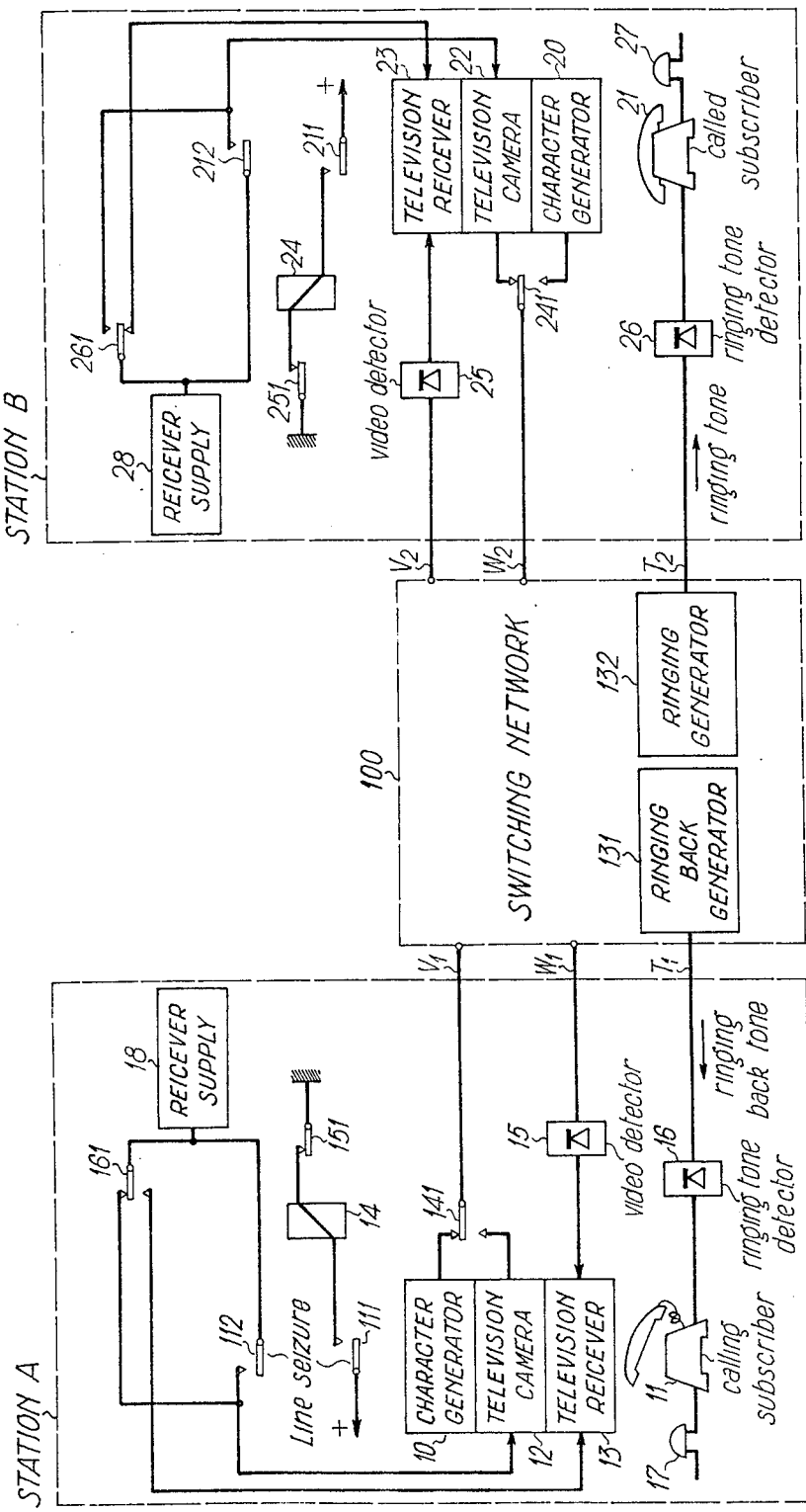
FIG. 1 shows, in diagram block form, the terminals respectively of a calling subscriber and a called subscriber, and also shows the connecting lines and the switching network.

Referring now to FIG. 1, the caller's terminal station A comprises a telephone set 11 with an audio bell 17, a television camera 12, a television receiver 13 and a character generator 10. The terminal station B of the person called comprises a telephone set 21 with an audio bell 27, a television camera 22, a television receiver 23 and a character generator 20. Each terminal is connected to a switching network 100 by a bidirectional telephone line, respectively $T_1$ and $T_2$, and two unidirectional video lines, respectively $V_1$ and $W_1$, and $V_2$ and $W_2$.

Ringing tone detectors 16 and 26 are respectively inserted in lines $T_1$ and $T_2$ and video signal detectors 15 and 25 are inserted in incoming lines $W_1$ and $W_2$. Further outgoing line $V_1$ can be selectively connected to the outputs of character generator 10 and television camera 12, under the control of relay 14 and, in a similar way, outgoing line $V_2$ can be selectively connected to the outputs of character generator 20 and television camera 22 under the control of relay 24. Relays 14 and 24 are controlled by the telephone switchhook of telephone sets 11 and 21.

When the calling subscriber in station A takes off his handset, his television camera and receiver are not immediately supplied with current by supply current circuit 18 as in the prior art. Only the television camera is supplied with current through closed contact 112 and, additionally, relay 14 operates through closed contact 111, contacts 111 and 112 being contacts of the switchhook of telephone set 11. Relay 14 connects character generator 10 to outgoing video line $V_1$ through contact 141. The calling subscriber then dials the called subscriber's number and consequently lines $T_1$, $V_1$, $W_1$ are connected respectively to lines $T_2$, $V_2$, $W_2$ in switching network 100. When the connection is achieved, switching network 100 connects ringing back tone generator 131 to telephone line $T_1$ and ringing tone generator 132 to telephone line $T_2$ in order to complete the call.

The ringing tone signal is detected by ringing tone detector relay 26 which is energized and closes contact 261, thus supplying with current television receiver 23. It is clear that, at this time, when the called subscriber has not yet taken down, the characters transmitted by character generator 10 are notwithstanding received by television receiver 23.

If the called subscriber decides to accept the call and takes off his handset, his television camera is normally supplied with current through contact 212 while television receiver 23 continues to be supplied through contact 261 at rest. Camera 22 begins transmitting video signals in video line $V_2$. These video signals are detected by video detector relay 15 inserted on video line $V_1$ which opens contact 151. Relay 14 is thus de-energized and contact 141 connects again video line $V_1$ to television camera 12. At this time, speech signals and image signals are transmitted and received as usual in video-telephone networks.

Figure 2:
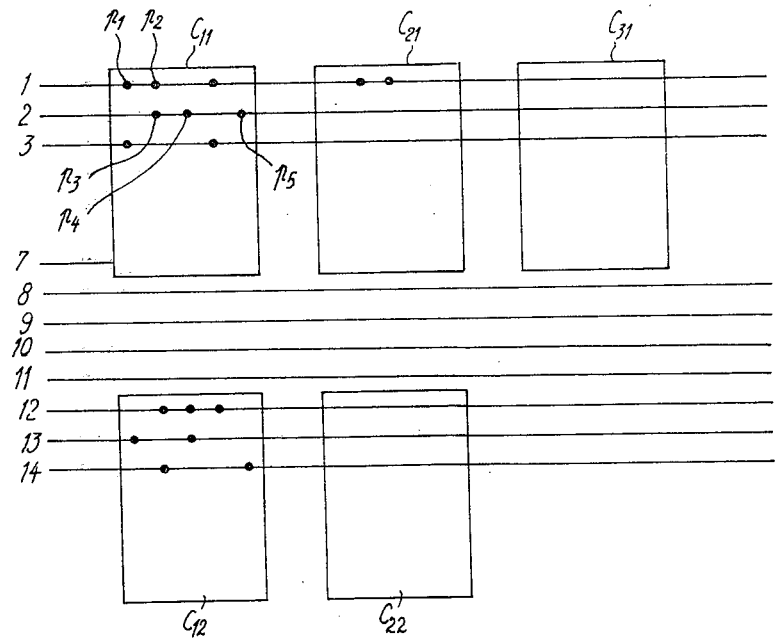
FIG. 2 shows in diagrammatic form, the method of formation of the matricial characters to be displayed on the television receiver screen of the called subscriber.

Referring now to FIG. 2, the characters $C_{ij}$ ($1 \leq i \leq 22$; $1 \leq j \leq 10$) formed on the television screen of the called subscriber are matricial characters consisting of selectively dark and blank spots located at the crosspoints of seven horizontal lines and five vertical columns. Subscripts $i$ and $j$ designate respectively the abscissa and the ordinate of a character on the screen. It will be assumed that the number of television lines per character row is equal to 12 comprising 7 significative lines and 5 dark lines defining the intervals between successive rows.

Figure 3:
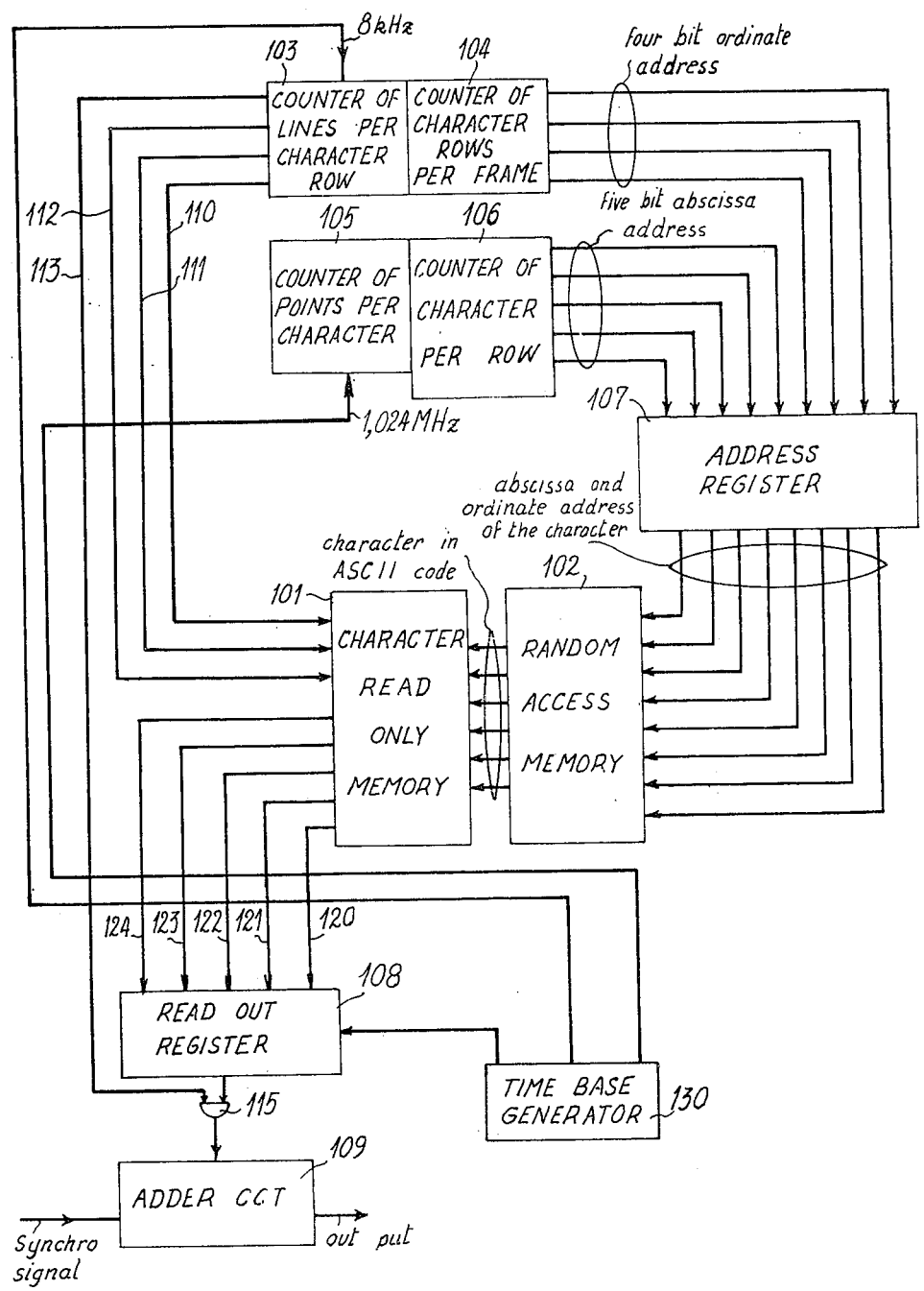
FIG. 3 is a diagram showing the character generator and its associated circuits.

FIG. 3 represents in block diagram form the character generator 10 or 20 of FIG. 1. It comprises a read only memory 101 having as its address register a random access memory 102 and four counters 103–106. Counter 103 counts the television lines per character row up to 12 that is from 0 to 11. Counter 104 counts the character rows per frame up to 10 that is from 0 to 9. Counter 105 counts the number of columns per character up to 6 that is from 0 to 5 (five character columns and one interval column). Counter 106 counts the character per row up to 22 that is from 1 to 21. Counter 103 receives from time base generator 130 timing pulses at the television line frequency, say 8 kHz and counter 105 receives from time base generator 130 timing pulses at the character column frequency. As there are six columns per character (including the between character interval) and 22 characters per row, the character column frequency must be at least $6 \times 22 \times 8 = 1,056$ MHz.

Counter 106 and counter 104 successively produce respective character abscissa addresses of five bits and character ordinate addresses of four bits which are applied to address register 107. Address register 107 compresses the nine bits of a pair of abscissa address and ordinate address into an eight bit address which serves to address random access memory 102. In response to address register 107, memory 102 generates six bit words representing the alphanumeric characters to be displayed in the ASCII code. These binary words are applied as addresses to read only memory 101 which issues five bit words on leads 120–124 which are entered into read out register 108.

Figure 4:
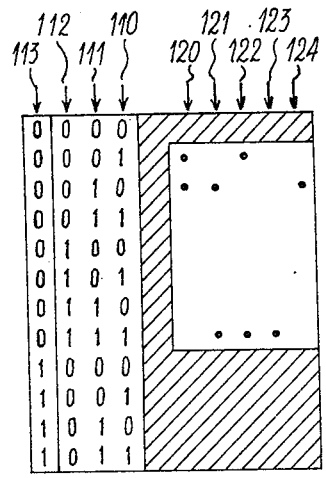
FIG. 4 shows a table and a sketch for explaining the formation of the matricial character representative signals.

Line counter 103 produces on leads 110–113 four bit words defining the television line number from 0 to 11. These four bit words are shown in the table of FIG. 4. The three low weight bits are applied to read only memory 101 in order to activate the same during seven television lines. The high weight bit is applied to AND-gate 115 in order to open it during seven lines and close it during five lines. Within the duration of a line the codes of the characters of the row produced by memory 102 are applied twelve times in sequence to read only memory 101.

The output of AND-gate 115 is connected to adder circuit 109 in which the synchro signal generated by the camera is added to the video pulses issued from read out register 108.

What we claim is:

1. In a video-telephone system comprising a switching network and subscriber stations each including a telephone handset and an associated audio bell actuated by a ringing tone signal, a television camera, a television receiver and a character generator, and connected to said switching network by a bidirectional telephone line and by an incoming and outgoing unidirectional video line conveying video signals, the improvement allowing a called subscriber to receive on his television receiver, before he has taken off his telephone handset, characters transmitted by a calling subscriber, the said improvement comprising in each subscriber stations means controlled by the handset taking off for connecting the character generator to the outgoing video line, means controlled by the handset taking off for supplying with current the television camera, means for detecting the ringing tone signal on the telephone line, means controlled by said ringing tone signal detecting means for supplying with current the television receiver, means for detecting the video signals on the incoming video line and means controlled by said video signal detecting means for connecting the television camera to the outgoing video line.

2. The improvement to a video-telephone system as claimed in claim 1, in which the character generator is a generator producing seven words of five bits representing matricial alpha-numeric characters to be displayed on the screen of the television receiver, said characters being defined by the crosspoints of seven rows and five columns and a one bit in a five bit word corresponding to an illuminated crosspoint on a crosspoint row, while a zero bit in said five bit word corresponds to a non-illuminated crosspoint in said crosspoint row.

3. The improvement to a video-telephone system as claimed in claim 1, in which the means for detecting the ringing tone signal on the telephone line is a relay and the means controlled by the ringing tone signal detecting means for supplying with current the television receiver is a contact of said relay. .

* * * * *